INVENTORS.
DONALD O. BECKNER
WALTER E. LAMLEIN
BY
Emery, Booth, Townsend, Miller & Weidner
ATTORNEYS Oct. 17, 1961   D. O. BECKNER ET AL   3,004,902
MANUFACTURE OF INSERTED-TOOTH SAW BITS AND SHANKS
Filed May 15, 1959   2 Sheets-Sheet 2

INVENTORS.
DONALD O. BECKNER
WALTER E. LAMLEIN
BY
Emery, Booth, Miller & Townsend
ATTORNEYS 3,004,902
MANUFACTURE OF INSERTED-TOOTH
SAW BITS AND SHANKS
Donald O. Beckner, South Lancaster, and Walter E. Lamlein, Leominster, Mass., assignors to Simonds Saw & Steel Co., Fitchburg, Mass., a corporation of Massachusetts
Filed May 15, 1959, Ser. No. 813,544
2 Claims. (Cl. 204—23)

The present invention relates to saws of the inserted tooth type, particularly circular saws for sawing timber, logs and other wood including especially the class of so-called head saws. It aims to provide such saws with improved bits and shanks novelly manufactured to have markedly superior anchorage in the receiving sockets therefor of the saw plates or blades together with improved cutting action and an extended useful life in operation along with other advantages that will appear herein.

In the accompanying drawings illustrating the invention:

Figure 2:
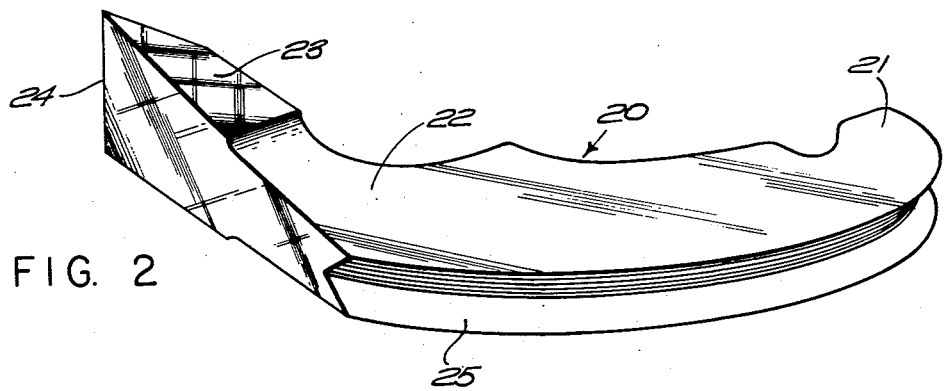
FIG. 2 shows separately a completed bit.
Figure 4:
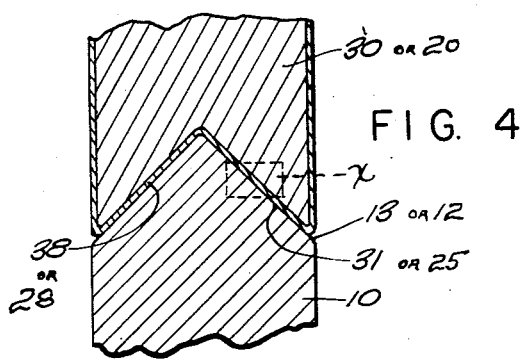
Figure 3:
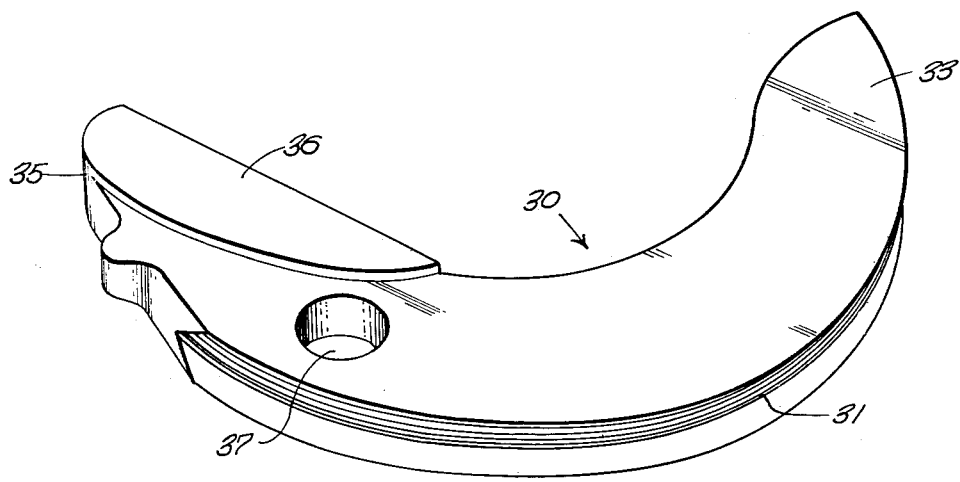
Figure 5:
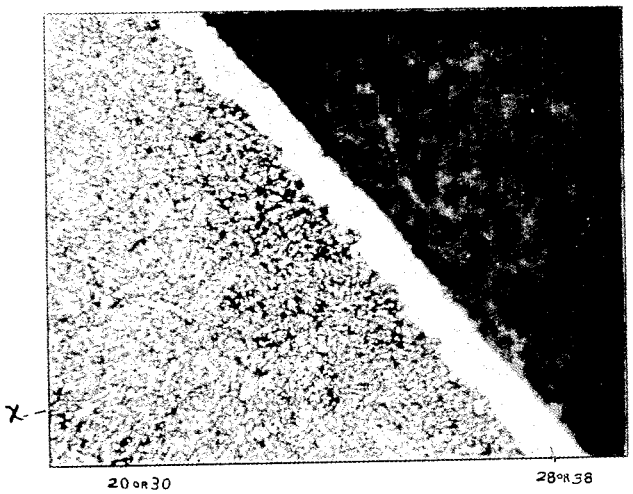

FIG. 3 similarly shows a completed shank separately;

FIG. 4 is a large-scale cross-sectional view of one insert piece, either bit or shank as for example on line 4—4 of FIG. 2; and FIG. 5 is a photographic view magnified approximately 1000× of a characteristic marginal cross-section of the bits and shanks of the invention, as at a wall of a V-groove thereof as indicated by the small dotted rectangle on FIG. 4.

Wood saws of the inserted tooth type have been known for many years and numerous shapes and constructions have been proposed for the insert pieces which are operatively installed removably in the sockets of the saw plate or blade. Such inserts as now generally supplied in the saw-making industry comprise pairs of coacting metal parts of which one part is termed the bit, that having a tip carrying the cutting edge, and the other part is termed the shank, adapted to lock up the bit in the particular receiving socket of the series thereof distributed about the saw plate. Among these are the bits and shanks for those circular saws known in the industry as the "Simonds Inserted Tooth Head Saws." These have been widely used and are well suited to operations where the amount of production or other conditions do not economically justify maintaining a saw filing room, since the bits are readily replaceable with a minimum of operating time loss. But despite various structural refinements as to the locking up function of the bits and shanks, and in the face of meticulous fabrication and close checking to insure a perfect fit for all parts, loosening or even bodily escape of the bits in the course of sawing operations sometimes occurs with or without breakage of one of the parts, especially under extreme conditions such the sawing of frozen timber or operation at too high speed in the cut in an effort to increase production.

Under the method of the present invention the resulting novel insert bits and shanks are found to possess markedly superior holding capacity in the saw sockets through an increased affinity of those surfaces of the bits and shanks which directly engage saw plate surface as at the respective V-shaped grooves and ribs. In addition the bits and shanks embodying the invention afford improved cutting action due in part to a better persistence of the cutting edge and in related part to a smoother and less frictional action, with reduced development of heating in the cut, and under the attendant resistance to corrosive action a generally freer cutting operation is had, with the saw dust discharging easily and with minimum clogging even under conditions of moisture in the wood. As a combined result of these several mechanical and functional advantages strikingly superior insert bits and shanks are made available under the novel method of the invention, which is applicable generally to the various known types and configurations of such inserted tooth saw elements.

From the foregoing it will be understood that the particular bits and shanks of the accompanying drawings, as to specific shape, size and proportioning, are selected merely as typically representative of the class of items concerned.

Figure 1:
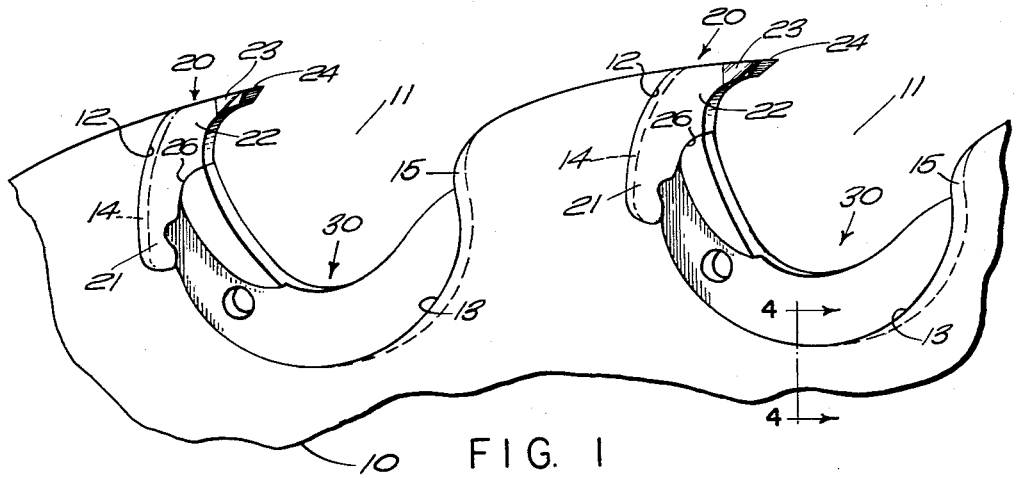
FIG. 1 shows a peripheral portion of a circular saw equipped with tooth bits and retainer shanks fashioned under hte method of the invention.

In FIG. 1 is shown a peripheral portion of a circular saw plate 10 having sockets 11 formed therein for the insertion of the bits 20 and the coacting anchor shanks 30. Each such socket 11 comprises a rear portion or seating recess 12 for a bit 20 and a main central and forward portion 13 at which a shank 30 is adapted to be slidably entered. The socket portions are formed at the defining edges with a guiding and seating rib 14 and 15 at the respective socket portions of inverted V-shape in cross-section to enter the corresponding V-groove of the respective insert pieces 20 and 30.

The respective insert bits 20 are elongate generally arcuate steel pieces each comprising a leg 21 and a head 22 terminating in a cutter tip 23 presenting a transverse chisel-like cutting edge as at 24. The rear wall of the bit from the head 22 to or substantially to the bottom of the leg 21 presents centrally the V-shaped groove 25 such as above mentioned. The front edge of the bit is appropriately formed for abuttive engagement by the shank 30 of the insert pair, as at the toe-receiving locking recess 26 at an intermediate location along the bit so as to afford thrusting support for the bit as installed in the seating socket portion 12.

Such bit 20 may be fabricated in any known or preferred fashion for application thereto of the method of the invention. Such initial fabricating steps thus may typically include selection of the steel blank and drop forging it to the desired configuration including the V-groove 25. Such drop forging may be annealed, abraded and trimmed of flash and tumbled if necessary to remove scale. The bit pieces desirably are subjected to a cold press operation and after milling of the butts are hardened, tempered and then given a side dress and a finish grind, particularly as to the tip and edge portions 23, 24, following which they desirably are subjected to a spin-drying step.

In accordance with the invention the bits at this fully worked stage are uniquely subjected to a barrelling or tumbling plating operation. This characterizing step of the total fabricating process, and which applies also to the shanks as will later be described, comprises the collection of a considerable number of the bits 20, depending on the volume capacity of the plating barrel available. Such collected mass of the bits is dumped helter skelter, as through a loading hopper, into the tumbler barrel generally in the form of a perforate cylinder or cylindrical screen vessel adapted to enter and be rotated in a nickel sulfamate bath. Tumbling barrel plating equipment as herein referred to is known and need not herein be illustrated. Any suitable and preferably perforate-walled vessel adapted to contain a mass of the bits in position to submerge them in the plating bath while continuously subjecting them to random tumbling action wherein all surfaces of the bits are more or less continuously or successively presented to the bath fluid may be used. Generally the bits as readied for the plating treatment are adequately clean but as a precautionary measure for assured best results the bits may be passed through a cleaning solution and rinse and a mild acid preferably followed by a second rinse.

The content of the nickel sulfamate bath may be that commercially available for general nickel plate but desirably is filtered and electrolytically purified to insure the application of a high quality jacket of the nickel plate. With proper nickel content and suitable control of density of plating current and temperature conditions as known to the plating art good coverage of all areas may be had even including cavities such as the wrench aperture of the shanks to be described, it being found that the throwing power of nickel sulfamate is high.

The tumbling processing as described has two simultaneous aspects mutually contributing to the improved results had from the finished bits and shanks. The tumbling action of the mass of discrete pieces in effect subjects them to an all-over and substantially uniform peening action at the same time that the thin coat of nickel 28 or 38, FIG. 4, is being collected upon them. The attendant action resembles that of ball peening or shot peening in which the entire surface area of the pieces receives a rapid succession of hammer blows which in the presence of the accumulating nickel effects an extremely intimate bond of the nickel film 28 or 38 with the surface steel of the bits and shanks in a manner approaching an intermolecular commingling. The tumbling plating treatment is continuously maintained for a substantial period, of at least 30 to 35 minutes and preferably 45 minutes or somewhat longer. This surface treating action by vigorous tumbling of the mass of the parts in a nickel sulfamate plating bath is in distinct contrast to results had either by tumbling alone or by plating alone, for example as heretofore attempted by chrome plating by the usual procedure of separate plating treatment of each piece as by suspension or rack plating or employing movable conveyors in still tanks.

Since neither a hammering treatment alone nor a plating treatment alone produces the beneficial results as herein disclosed, it is evident that the simultaneous peening of the bits and the nickel sulfamate plating onto them have a synergistic interrelation which produces the surprising advantages found in the bits and shanks as herein disclosed.

Considering now more particularly the shanks 30, FIG. 3, in the example selected for illustration these have a general crescentic shape and are proportioned and designed for coaction with the particular bits such as 20 hereof. They are formed centrally along the convex margin with the mentioned V-groove 31 for seating and guiding reception of the rib portion 15 of the saw socket. The opposite or concave margin of each shank 30 has a generally semi-circular contour providing with the forward portion of the bit 20 of the insert pair a well-formed roomy gullet. At the forward end the shank has a terminal heel 33, while the other or rear end terminates in a locking toe 35 with rearwardly projecting arcuate and non-grooved wall for thrusting reception in the recess 26 of the corresponding bit. The toe and adjacent portion of the shank may be swedged as at 36 and the adjacent body of the shank somewhat countersunk. A tool-receiving aperture 37 is provided at an intermediate location along the shank, for use in installation and removal of the bits with respect to the saw plate.

As stated with reference to the bits 20 the shanks 30 may be fabricated in preparation for processing under the invention in any preferred manner. Thus, for example, the selected steel stock is blanked out and edge milled and the tool-aperture 37 drilled, with swaging and countersinking at the respective sides to afford the somewhat thicker portion 36 adjacent the toe 35. The V-groove 31 and other contact surfaces desirably are milled and abraded, the entire shank then being hardened, spin-cleaned and tempered. At this stage wherein all or most of the working has been accomplished a mass of the properly cleaned shanks is collected and loaded into the tumbling vessel or barrel and subjected to the simultaneous peening and nickel sulfamate plating bath action as already detailed in connection with the manufacture of the bits.

As to both the bits 20 and the shanks 30 upon completion of the extended period of simultaneous tumble-hammering and nickel plating the pieces are removed from the nickel sulfamate bath, rinsed and dried as by hot air and conveyed in any suitable manner to the counting, inspecting and packaging station or otherwise placed in stock or readied for shipment.

With respect both to the bits 20 and the shanks 30 the coating layer of the nickel plate 28, 38 need be but a relatively thin film as for example in the range of about .00015 to .00035 in. On the average a nickel plate 28, 38, of .00025 in. thickness has been found highly satisfactory. In this connection it will be understood that the cross-sectional showing in FIG. 4 is not to scale and is partly diagrammatic, with the plating jacket, layer or skin 28, 38 exaggerated as to thickness. Again merely by way of example, employing a filtered and electrolytically purified commercially available nickel sulfamate solution and subjecting the bits and the shanks to the described percussive tumbling for approximately 45 minutes subject to plating current in a bath of such solution at substantially room temperature, an overall plate 28, 38 averaging .00020 to .00025 in. has been obtained and found satisfactory for the purposes.

The resulting bits and shanks 20, 30 of the invention have a semi-bright or "white" appearance and have a notably smooth feel. As apparent from the highly magnified photographic view FIG. 5, taken transversely across the V-groove 25 of a bit 20 and 31 of a shank 30, under a power of 1000×, the percussively peened-in nickel skin 28, 38 positively fills in the valleys and voids at the interface with the steel bits and shanks 20, 30 and buries and levels over the minute steel protuberances otherwise present. The relatively smooth uniformly continuous outer face of the nickel skin 28, 38 thus presents a greatly increased area of level metal for immediate direct-engaging contact with the opposed steel of the V-rib 14, 15 of the bit and shank sockets. In effect there is a markedly extended monoplanar area of metal, that of the nickel skin, presented in bearing contact with the steel surface of such rib and which, under the relative softness of the nickel, is adapted to be entered and interlocked into by the minute irregularities at the surface of the steel V-rib against which the bits and shanks are locked up under thrusting pressure. This unexpectedly improved locking action thus appears to be due to the increased galling capacity or ability of the nickel surface at the bit and shank V-grooves to gall with the steel surface of the ribs of the said plate sockets.

It is to be noted that in FIG. 5 the dark area at the right is merely photographic background against which the cross-sectional portion of V-grooved nickel-coated bit or shank 20 or 30 is shown; it is not the steel of the saw plate such as 10 of FIG. 4; also that for full positional correspondence of FIG. 5 with the small dotted rectangle on FIG. 4 locating representative area of magnification, said FIGS. 4 and 5 should be relatively inverted; in other words the right-hand area $x$ of FIG. 4 is the left-hand area $x$ of FIG. 5.

Thus under the invention in the installation of the novel bits and shanks into the saw sockets the relatively "soft" skin of the nickel plate 28, 38 effects a mechanical gripping or galling engagement with the relatively hard steel surface of the V-ribs 14, 15 of the saw plate. There results a firm seating and holding action such that in actual use in sawing operations loosening or escape of the inserted tooth parts is markedly reduced. Further, saws equipped with the bits and shanks of the invention are found to run with more freedom in the cut and the saw dust clears freely from the gullets even in operations upon logs containing substantial moisture. In conjunction with these major and unexpectedly improved results the percussively nickel plated bits and shanks are resistant to corrosion and the cutting edges 24 of the bits 20 hold their sharpness over an importantly increased working period.

It will be understood that our invention, either as to method or product, is not limited to the exemplary steps or embodiments herein illustrated or described, and we set forth its scope in our following claims.

We claim:

1. In the manufacture of insert tooth members for circular saws, the method which comprises selecting and rough shaping steel stock to desired bit and shank conformation, forming a central longitudinal V-groove along the convex edges of the bits and shanks, grinding and surface-working the parts to operative form, collecting a mass of the individual formed and worked parts, and subjecting them to a continuously prolonged percussive tumbling action in a fluid-admitting container while submerged in a plating bath of nickel sulfamate and passing electrical plating current through said bath.

2. The method of claim 1 wherein the tumbling is effected by rotating a perforate cylindrical vessel containing the parts collection and is continued for at least 30 to 45 minutes in the nickel sulfamate bath subject to the electrical plating current and whereby a skin of nickel metal of about .00015 to .00035 depth is formed on the surfaces of such tooth members and particularly including the surfaces of the V-groove thereof and thereat presenting saw-plate-engageable minute surface irregularities affording increased galling capacity for said members.

References Cited in the file of this patent

UNITED STATES PATENTS

| | | |
|---|---|---|
| 326,684 | Simonds | Sept. 22, 1885 |
| 780,606 | Fox | Jan. 24, 1905 |
| 1,800,947 | Mason | Apr. 14, 1931 |
| 1,963,302 | Hoff et al. | June 19, 1934 |
| 2,546,150 | Brenner et al. | Mar. 27, 1951 |
| 2,624,381 | Von der Werth | Jan. 6, 1953 |
| 2,766,201 | Luther | Oct. 9, 1956 |
| 2,791,248 | Beale | May 7, 1957 |